No. 660,852. Patented Oct. 30, 1900.
F. HACHMANN.
ELECTRODE FOR ARC LAMPS.
(Application filed Dec. 22, 1899.)
(No Model.)

Witnesses.
O. N. Keeney.
Anna V. Faust.

Inventor.
Frederick Hachmann
By Benedict Morsell
Attorneys.

UNITED STATES PATENT OFFICE.

FREDERICK HACHMANN, OF ST. PAUL, MINNESOTA, ASSIGNOR OF THREE-FOURTHS TO LOUIS HILL AND MAX TOLTZ, OF SAME PLACE, AND ELISA-BETH BAASEN, OF MILWAUKEE, WISCONSIN.

ELECTRODE FOR ARC-LAMPS.

SPECIFICATION forming part of Letters Patent No. 660,852, dated October 30, 1900.

Application filed December 22, 1899. Serial No. 741,217. (No model.)

*To all whom it may concern:*

Be it known that I, FREDERICK HACHMANN, of St. Paul, in the county of Ramsey and State of Minnesota, have invented a new and useful Improvement in Electrodes for Arc-Lamps, of which the following is a description, reference being had to the accompanying drawings, which are a part of this specification.

The object of my invention is to provide electrodes for arc-lamps that are strong and durable in quality and that by reason of their novel construction are capable of high efficiency as light-producing means in connection with and as a part of a conducting-circuit for electricity.

The invention consists of the electrode as herein described and claimed or the equivalent thereof.

Figure 1:
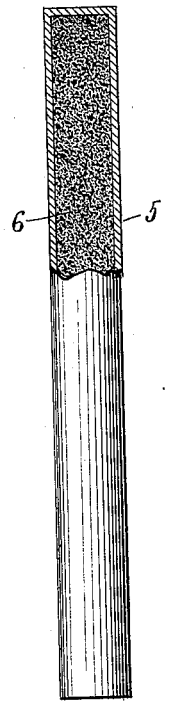
Figure 2:
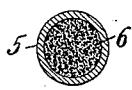
Figure 3:
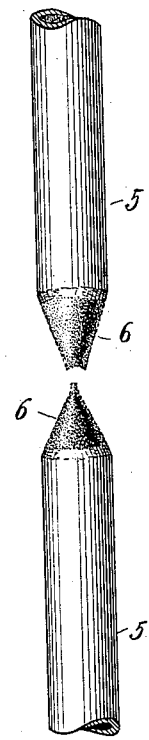

In the drawings, Figure 1 shows an electrode or rod of my improved construction adapted for use in an electric-arc lamp, a portion of the rod being broken away and shown in section to exhibit the interior construction. Fig. 2 is a transverse section of the rod or electrode. Fig. 3 shows a fragment of two electrodes placed near each other end to end in the manner in which these rods used as electrodes are employed in arc-lights and in the manner that my improved electrodes are adapted to be used.

My improved rod adapted to be used as an electrode and as shown in Fig. 1 is composed of a hard tubular shell 5, composed of hard carbon, and this tubular shell is filled with calcium carbid 6, which calcium carbid of the powdered or pulverized form found in the market is held together in a mass in the shell 5 by means of some suitable adhering and holding material. For this purpose tar or some analogous viscid or adhering substance may be employed. This calcium carbid, bound together in a mass by some binding material, as tar or some analogous substance, is forced compactly into the tubular carbon shell 5 and by its compact and adherent quality remains in the shell and forms therewith the completed rod adapted for use as an electrode in an arc-lamp in the manner indicated in Fig. 3. Electrodes thus constructed are capable of high efficiency in an arc-lamp, as the electrode not only is adapted to transmit electricity and produce the arc-light caused by the passage of the electricity from one electrode to the other through the air of the intervening space between the electrodes, but the action of the electricity on the calcium carbid at the adjacent ends of the electrodes generates a certain amount of gas from the calcium carbid, which gas is burned in and with the electric-arc light, thereby materially intensifying the light that would under similar conditions and with the same electric current be produced by the use of the ordinary hard-carbon electrodes. It is also found that the action of the electricity on these calcium-carbid-filled electrodes prevents the undue decomposition of the calcium carbid at the ends of the electrodes, while the calcium-carbid filling is protected throughout the length of the rod from exposure to the moisture of the air or rain by the hard-carbon shell, thus effectually preserving the life and the quality of the calcium-carbid filling of the rod.

What I claim as my invention is—

1. An electrode for an electric-arc lamp comprising a tubular shell of hard carbon, and a filling of calcium carbid with an adhering and binding material.

2. An electrode for an electric-arc lamp consisting of calcium carbid incased in a shell of hard carbon or analogous material.

3. A pair of arc-lamp electrodes located adjacent to each other end to end, each electrode consisting of an inclosing hard-carbon shell and a filling of calcium carbid held in place by cohering material.

In testimony whereof I affix my signature in presence of two witnesses.

FREDERICK HACHMANN.

Witnesses:
 C. T. BENEDICT,
 ANNA V. FAUST.